United States Patent
Fradet et al.

(10) Patent No.: US 12,272,095 B2
(45) Date of Patent: Apr. 8, 2025

(54) DEVICE AND METHOD FOR DEVICE LOCALIZATION

(71) Applicant: InterDigital CE Patent Holdings, Paris (FR)

(72) Inventors: Matthieu Fradet, Chanteloup (FR); Vincent Alleaume, Pace (FR); Anthony Laurent, Vignoc (FR); Philippe Robert, Rennes (FR)

(73) Assignee: InterDigital CE Patent Holdings, Paris (FR)

( * ) Notice: Subject to any disclaimer, the term of this patent is extended or adjusted under 35 U.S.C. 154(b) by 403 days.

(21) Appl. No.: 17/787,391

(22) PCT Filed: Dec. 10, 2020

(86) PCT No.: PCT/EP2020/085424
§ 371 (c)(1),
(2) Date: Jun. 20, 2022

(87) PCT Pub. No.: WO2021/122265
PCT Pub. Date: Jun. 24, 2021

(65) Prior Publication Data
US 2023/0019181 A1      Jan. 19, 2023

(30) Foreign Application Priority Data
Dec. 20, 2019   (EP) .................... 19306739

(51) Int. Cl.
*G06T 7/73* (2017.01)
*H04W 4/029* (2018.01)

(52) U.S. Cl.
CPC ........................ *G06T 7/74* (2017.01)

(58) Field of Classification Search
None
See application file for complete search history.

(56) References Cited

U.S. PATENT DOCUMENTS

| 9,628,749 B2 | 4/2017 | Donatelli et al. |
| 10,089,794 B2 | 10/2018 | Byrne et al. |

(Continued)

FOREIGN PATENT DOCUMENTS

| EP | 2249307 B1 | 7/2019 | |
| JP | 2018014579 | * 1/2018 | ............. H04N 5/232 |
| KR | 20070116352 | * 12/2007 | ............. G01S 19/01 |

OTHER PUBLICATIONS

W. Elloumi, K. Guissous, A. Chetouani and S. Treuillet, "Improving a vision indoor localization system by a saliency-guided detection," 2014 IEEE Visual Communications and Image Processing Conference, Valletta, Malta, 2014, pp. 149-152, doi: 10.1109/VCIP.2014.7051526 (Year: 2014).*

(Continued)

*Primary Examiner* — Beniyam Menberu
(74) *Attorney, Agent, or Firm* — Condo Roccia Koptiw LLP

(57) ABSTRACT

Localization of a user device in a mixed reality environment in which the user device obtains at least one keyframe from a server, which can reside on the user device, displays at least one of the keyframes on a screen, captures by a camera an image of the environment, and obtains a localization result based on at least one feature of at least one keyframe and the image.

20 Claims, 2 Drawing Sheets

(56) References Cited

U.S. PATENT DOCUMENTS

| | | | |
|---|---|---|---|
| 10,235,805 B2 | 3/2019 | Nakamura et al. | |
| 10,380,993 B1 | 8/2019 | Clauer | |
| 2006/0271517 A1* | 11/2006 | Deloach | H04W 64/00 |
| 2012/0063685 A1 | 3/2012 | Chamaret et al. | |
| 2013/0258117 A1 | 10/2013 | Penov et al. | |
| 2013/0259308 A1* | 10/2013 | Klusza | G06T 19/00 |
| | | | 382/103 |
| 2014/0067429 A1 | 3/2014 | Lowell | |
| 2014/0323148 A1* | 10/2014 | Schmalstieg | H04W 4/029 |
| | | | 455/456.1 |
| 2014/0342756 A1* | 11/2014 | Houri | G06F 16/9537 |
| | | | 455/456.2 |
| 2018/0213359 A1* | 7/2018 | Reinhardt | G06F 16/907 |
| 2019/0114802 A1* | 4/2019 | Lazarow | H04W 56/001 |
| 2019/0196680 A1 | 6/2019 | Park et al. | |
| 2019/0253614 A1 | 8/2019 | Oleson et al. | |
| 2020/0035099 A1* | 1/2020 | Sivakumar | G08G 1/096827 |
| 2020/0132461 A1* | 4/2020 | Ondruska | H04N 13/204 |
| 2020/0349735 A1* | 11/2020 | Dine | G06T 7/74 |
| 2021/0110615 A1* | 4/2021 | Zhao | G06T 5/70 |

OTHER PUBLICATIONS

Othman et al., "An Indoor Room Classification System for Social Robots via Integration of CNN and ECOC", Multidisciplinary Digital Publishing Institute (MDPI), Applied Sciences, Jan. 30, 2019, 16 pages.

Kendall et al., "PoseNet: A Convolutional Network for Real-time 6-DOF Camera Relocalization", Computer Vision Foundation, Proceedings of the IEEE International Conference on Computer Vision (ICCV), Dec. 2015, 9 pages.

Redmon et al., "YOLOv3: An Incremental Improvement", Source Url: https://arxiv.org/abs/1804.02767, Apr. 8, 2018, 6 pages.

Alcantarilla et al., "Fast Explicit Diffusion for Accelerated Features in Nonlinear Scale Spaces", British Machine Vision Conference (BMVC), Bristol, Great Britain, Sep. 2013, 11 pages.

Van Den Oord et al., "Wavenet: A Generative Model for Raw Audio", 9th ISCA Speech Synthesis Workshop, Sunnyvale, California, USA, Sep. 13, 2016, 15 pages.

Barnes et al., "PatchMatch: A Randomized Correspondence Algorithm for Structural Image Editing", Association for Computing Machinery (ACM), ACM Transactions on Graphics. Volume 28, Issue 3, Aug. 2009, Article No. 24, 10 pages.

Ren et al., "Faster R-CNN: Towards Real-Time Object Detection with Region Proposal Networks", Advances in Neural Information Processing Systems, Jan. 6, 2016, 14 pages.

Kacete et al., "Decision Forest for Efficient and Robust Camera Relocalization", Institute of Electrical and Electronics Engineers (IEEE), 2017 IEEE International Symposium on Mixed and Augmented Reality, Nantes, France, Oct. 9, 2017, 6 pages.

Vinyals et al., "Show and Tell: Lessons learned from the 2015 MSCOCO Image Captioning Challenge", Institute of Electrical and Electronics Engineers (IEEE), IEEE Transactions on Pattern Analysis and Machine Intelligence, vol. 39, Issue: 4, Apr. 1, 2017, 12 pages.

Lowe David G., "Object Recognition from Local Scale-Invariant Features", Proceedings of the Seventh IEEE International Conference on Computer Vision, Kerkyra, Greece, Sep. 20, 1999, 8 pages.

* cited by examiner

DEVICE AND METHOD FOR DEVICE LOCALIZATION

CROSS REFERENCE TO RELATED APPLICATIONS

This application is a U.S. National Stage Application under 35 U.S.C. 371 of International Patent Application No. PCT/EP2020/085424, filed Dec. 10, 2020, which is incorporated herein by reference in its entirety.

This application claims the benefit of European Application No. 19306739.4, filed Dec. 20, 2019, which is incorporated herein by reference in its entirety.

TECHNICAL FIELD

The present disclosure relates generally to mixed reality (MR) and in particular to relocalization in MR systems.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Mixed reality (MR) merges reality and virtual environments so that physical, real-world objects and virtual, digital objects co-exist.

To interact with the environment in a MR session, a user typically uses a MR capable device, e.g. a device equipped with both at least one capturing sensor, such as a camera, and a presentation area, such as a screen of a tablet in a video pass-through approach or semi-occluding screens close to the user's eyes in a MR headset.

In advanced MR applications, realism of real-virtual interactions (e.g. occlusions, contacts and shadows) is important for good user experience, and because of this, for user acceptation. Such realism requires integration between the real and the virtual world.

In MR applications where the virtual world has been developed for the real world, for example when the developers were aware of the environment in which the MR application was to be used, the integration is typically built into the application during its conception.

However, there are also cases where the MR application is to be used in an environment unknown to the developers during the design and distribution of the application. This can be the case when the MR application is intended for use in the homes of many different end users.

In this case, the MR application typically obtains information from the sensor(s), such as photos or video, and constructs the virtual world to fit the real world environment. For good integration between the real and the virtual worlds, the position and orientation of the user device needs to be estimated (i.e. the position of the device sensor in the coordinate system in which this environment is expressed).

When at least a part of the user's environment has already been observed and reconstructed—potentially observed by another user device—and is available either from previous instants of the current session or from a previous session, relocalization includes recognizing already observed areas of the environment and using these areas to estimate the current sensor position from which a new camera tracking process can start. This relocalization is ideally performed using a single image or frame captured by the device.

Conventional relocalization solutions perform 2D/3D matching of keypoints, or compute whole-image similarity measures against a set of keyframes with known camera pose. Most recent approaches are based on Random Forest (see A. Kacete et al., [POSTER] Decision Forest for Efficient and Robust Camera Relocalization, ISMAR Adjunct, 2017) or Deep Learning (see A. Kendall et al., PoseNet: A Convolutional Network for Realtime 6DOF Camera Relocalization, ICCV, 2015).

However, a problem for the user holding (or wearing) the device is that the areas of the environment that have been observed and/or are sufficiently discriminative can be unknown. Put another way, the user may not know how to orient the device to maximize the chances of obtaining an accurate sensor position estimation. This can result in relocalization failure, in particular if the user focuses on unknown or indiscriminative areas. Before correct localization of the device, it may happen that the MR session fails to start or that the virtual objects are displayed at wrong locations with inappropriate interactions with the real world. Regarding the user experience, the quicker the relocalization, the better.

It will thus be appreciated that there is a desire for a solution that addresses at least some of the shortcomings of the described device localization. The present principles provide such a solution.

SUMMARY OF DISCLOSURE

In a first aspect, the present principles are directed to a method comprising, in at least one hardware processor of a user device, obtaining at least one keyframe being an image of a position in an environment that could enable localization of the user device, displaying at least one of the keyframes on a screen, capturing by a camera an image of the environment, and obtaining a localization result based on at least one feature of at least one keyframe and the image captured by the camera.

In a second aspect, the present principles are directed to a user device comprising a screen, a camera, and at least one hardware processor configured to obtain at least one keyframe being an image of a position in an environment that could enable localization of the user device, display at least one of the keyframes on a screen, capture by the camera an image of the environment, and obtain a localization result based on at least one feature of at least one keyframe and the image captured by the camera.

In a third aspect, the present principles are directed to a server device comprising a communication interface configured to communicate with a user device and at least one hardware processor configured to receive from the user device a message indicating that the user device is not localized, select and send to the user device at least one keyframe being an image of a position in an environment that could enable localization of the user device, receive an image from the user device, obtain a localization result based on the at least one feature of at least one keyframe and the image received from the user device, and send the localization result to the user device.

In a fourth aspect, the present principles are directed to a computer program product which is stored on a non-transitory computer readable medium and includes program code instructions executable by a processor for implementing the steps of a method according to any embodiment of the first aspect.

BRIEF DESCRIPTION OF DRAWINGS

Features of the present principles will now be described, by way of non-limiting example, with reference to the accompanying drawings, in which.

DESCRIPTION OF EMBODIMENTS

Figure 1:
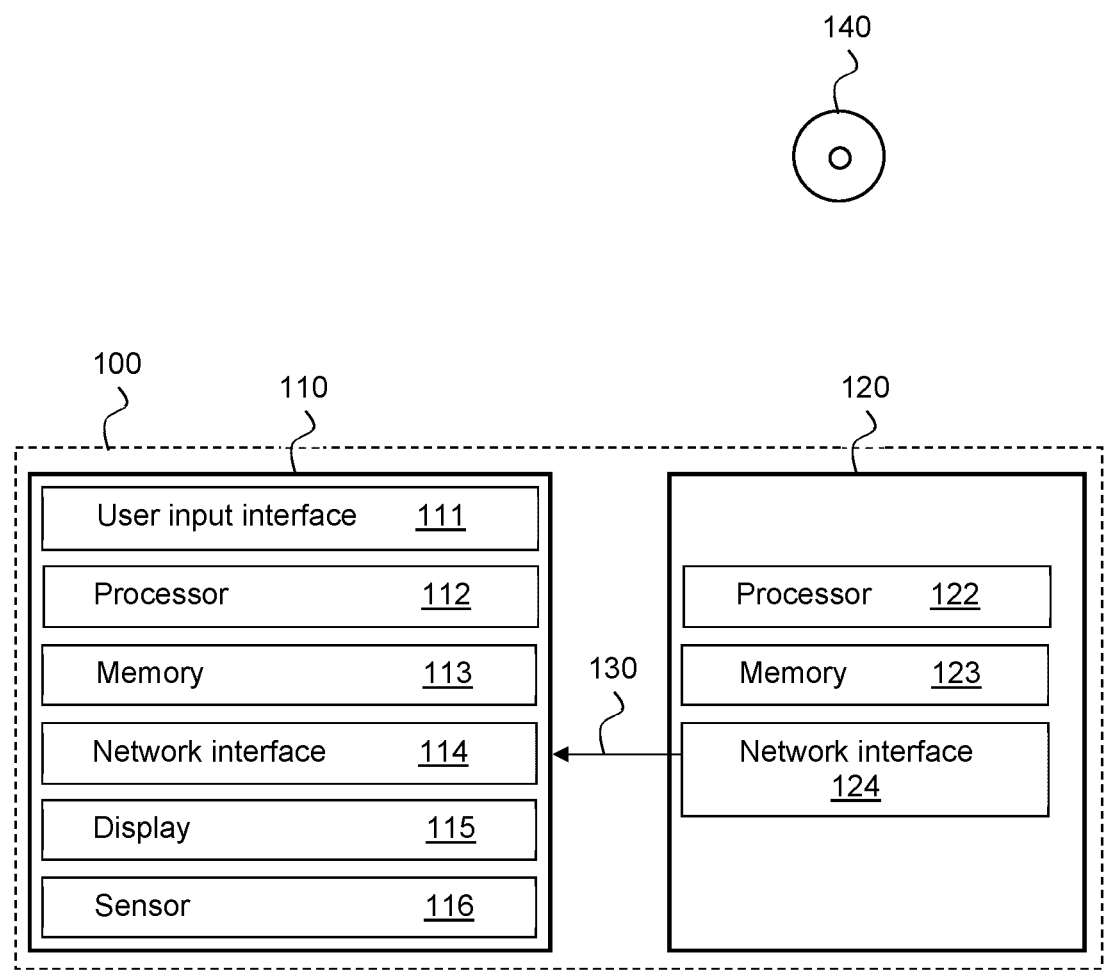
FIG. 1 illustrates a mixed reality (MR) system according to an embodiment of the present principles.

FIG. 1 illustrates a mixed reality (MR) system 100 according to an embodiment of the present principles. The system 100 includes a user device 110, such as a smartphone, tablet or a headset. The user device 110 can be self-sufficient, but in an embodiment it interacts with a server 120, which for example can be located in a game console, a gateway or a server on the Internet.

The user device 110 typically includes at least one user interface 111, at least one hardware processor ("processor") 112, memory 113, a communication interface 114, a display 115 and at least one sensor 116. A non-transitory storage medium 140 stores computer-readable instructions that, when executed by at least one processor, perform a method of the present principles, such as the method described with reference to FIG. 2.

The at least one user interface 111, which can include the display 115, is configured for interactions with a user. It includes at least one user input device such as a keyboard, a mouse or one or more buttons and can further include a speaker, LED or the like to provide information to the user. The user interface can for example be a touch screen.

The processor 112 configured to execute program code instructions to perform a relocalization method according to the present principles.

The memory 113, which can be at least partly non-transitory, is configured to store the program code instructions to be executed by the processor 112, parameters, image data, intermediate results and so on.

The communication interface 114 is configured for communication with external devices, for example the server 120, over any suitable connection 140, wired or wireless or a combination of the two.

The display 115 is configured to display a MR environment, for example to overlay virtual objects over the environment captured by the sensor 116.

The sensor 116, which typically includes at least one camera, is configured to capture photos and/or video of the environment in its capture area.

The system 100 can also include the server 120 including at least one hardware processor ("processor") 122 configured to execute program code instructions to partake in a relocalization method according to the present principles, memory 123 configured to store the program code instructions to be executed by the processor 122, parameters, image data, intermediate results and so on, and a communication interface 124 configured for communication with external devices, for example the user device 110, over the connection 140, wired or wireless or a combination of the two.

In this description, the present principles will, as a non-limiting example, be implemented in the user device 110 and the server 120. It should however be kept in mind that in at least some embodiments, the user device 110 can perform all, or most of, the present principles. Further, the expression position (also called pose) of a sensor or device typically includes the location in the environment as well as the direction of the sensor (e.g. the camera) capturing the environment. In addition, the description will use the expression image or images, but it is to be noted that this can also denote video.

Very generally, the present principles take images of an environment captured by at least one user device and process the images to reconstruct a 3D representation of the environment, to estimate the position and orientation in the environment of the camera of the user device for each captured image, and to generate a set of keyframes as a representative subset of the captured images. Then, when a user device (one that captured images, or a different user device) is to be localized, information relating to at least one keyframe is provided to the user as an indication of a position that could enable localization. The user device can then capture at least one image that is used for comparison with at least one keyframe, which can enable device localization in case of a match.

Keyframe Generation

User devices 110 are configured to provide at least a subset of its captured images, i.e. "keyframes", to the server 120 along with, if available, the corresponding position. The server 120 processes these images to reconstruct and store a, preferably complete or practically complete, representation of the observed environment. The server 120 can store the representation, which can be a 3D representation including 3D feature points.

The server 120 can process the images to reduce their number. This can be done to for example reduce storage requirements, bandwidth requirements, or to provide more relevant information to the user.

The server 120 can thus detect and remove images that do not contain sufficient information to allow localization, such as for example an image of an empty wall or a nondescript floor. This can for example be done by extracting feature points for each keyframe and keeping only keyframes with a number of feature points larger than a given threshold, or by selecting a number or a percentage of keyframes with the greatest number of feature points. Such feature points can be extracted using e.g. SIFT—see for example David G. Lowe, *Object Recognition from Local Scale-Invariant Features*, IJCV, vol. 2, 1999, p. 1150-1157—or AKAZE—see for example Pablo F. Alcantarilla et al., *Fast Explicit Diffusion for Accelerated Features in Nonlinear Scale Spaces*, In British Machine Vision Conference (BMVC), Bristol, UK, September 2013.

Then the server 120 can detect groups of keyframes that contain similar or redundant information and extract a representative keyframe for each group. This can for example be done by first calculating distances between pairs of keyframes.

The distance can be defined between image histograms, for example based on zero-normalized cross-correlation (ZNCC) or Chi-Square distance.

The distance can also be based on a nearest neighbor field computation; see for example Connelly Barnes et al., *Patch-Match: A Randomized Correspondence Algorithm for Structural Image Editing*, ACM Transactions on Graphics (Proc. SIGGRAPH) 28(3), 2009. An exemplary algorithm for nearest neighbor field computation works as follows. For each patch of keyframe A, the closest (e.g. based on Sum of Squared Differences, SSD) patch in keyframe B is found. As is known, a patch is a region, e.g. a small square, of the keyframe. Then the distance from keyframe A to keyframe B is defined as the mean SSD over the patches of A. It is noted that this distance is non-symmetric. The smaller this distance, the more content of A is contained in B, and the easier is the reconstruction of A using information coming from B. If d(A,B)>d(B,A), then A contains more information than B.

Once the distances have been computed, the server 120 can perform hierarchical clustering of the keyframes. Starting with as many singleton-clusters as keyframes, the pair of keyframes I and J with the smallest distance d(I, J) is found, I and J are grouped in the same cluster, and J is used as the representative keyframe of cluster {I,J} For every other keyframe K, the distances d(K,J) and d(J,K) between K and cluster {I,J} are considered. Since hierarchical clustering generate the clusters from bottom to top, the keyframes are automatically ordered such that it is possible to select the N top keyframes directly, these top keyframes being the N most representative of the initial set. It is noted that it is possible to change the value of N on demand without having to perform the clustering again, which means that the following P most representative keyframes easily can be provided.

Following this keyframe generation, the server 120 stores a set of keyframes with discriminative features and known positions.

It is noted that the 3D reconstruction and the keyframe generation can be performed again, such as when a user device provides a new image of the environment to the server and in particular when the new image is of a not previously observed part of the environment.

User Device Localization

Figure 2:
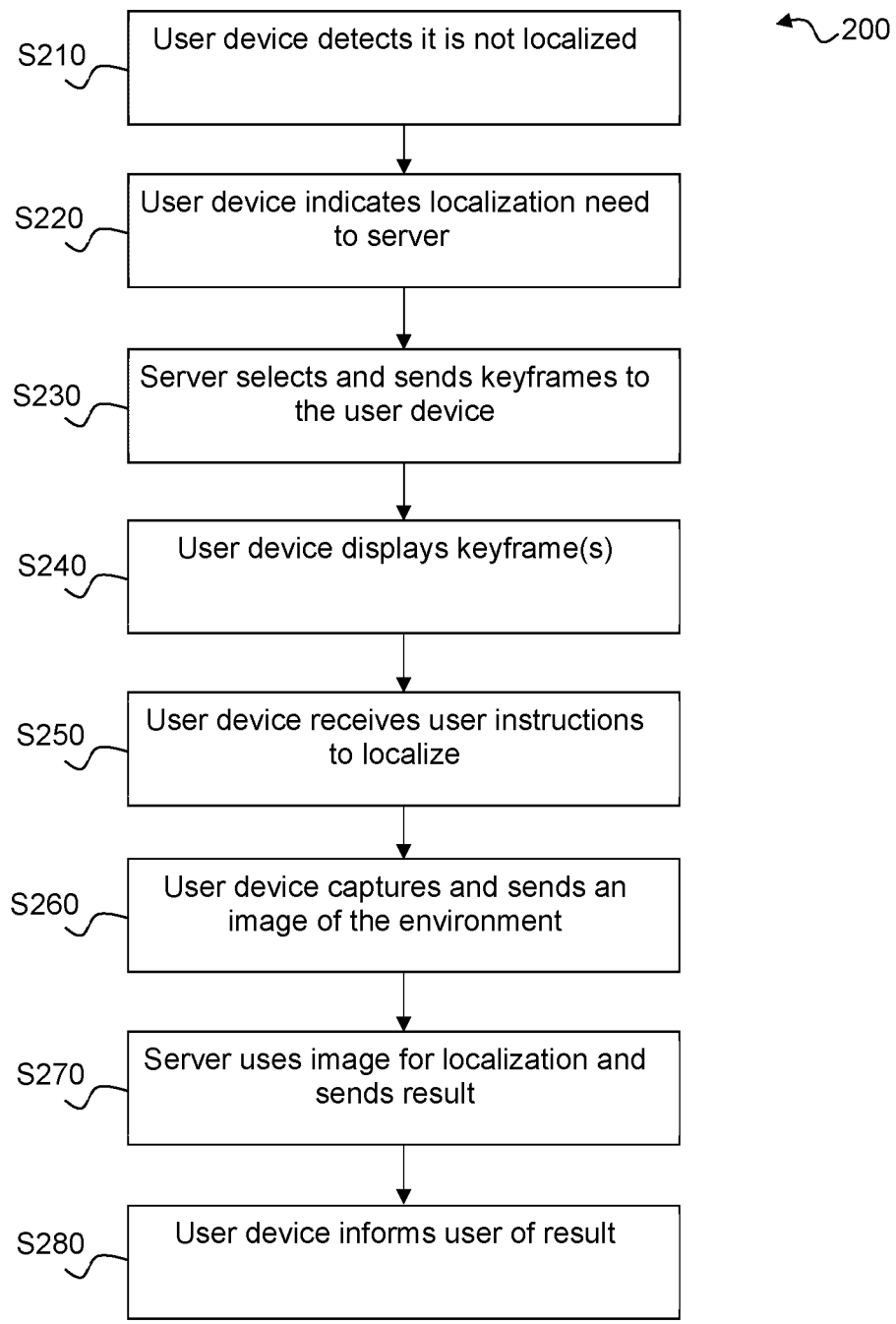
FIG. 2 illustrates a flowchart for a method for user device localization according to an embodiment of the present principles.

FIG. 2 illustrates a method of user device localization according to an embodiment of the present principles.

In step S210, the processor 112 of the user device 110 determines that it is not localized. This can occur when the MR application (or program or feature . . . ) is activated on the user device 110 (and thus has not yet been localized) or when the user device 110 has been localized but has lost the tracking. The determination can trigger the following step.

In step S220, the processor 112 of the user device 110 sends a message to the server 120. The message can indicate that the MR application has been activated or that the tracking has been lost, and that the user device 110 thus needs to be localized. The message can also include an indication of the position of the user device 110, such as for example GPS coordinates or an identifier of the wireless device, e.g. the gateway, repeater or base station, with which the user device 110 is directly connected.

In response to the message, in step S230, the server 120 selects a number of keyframes determined to be most relevant to the localization of the user device 110 and sends these keyframes to the user device 110. These keyframes can for example be the N most representative keyframes already mentioned or a selection of keyframes based at least on the indication of the position of the user device 110.

Upon reception from the server 120 of the keyframes, in step S240, the user device 110 displays at least one of the keyframes on the screen 115. The at least one keyframe is preferably displayed at the edge or in a corner of the screen 115 so that the user at the same time can see what is captured by the camera 116. In case the user device 110 does not display all the received keyframes at once, the user device 110 can change the displayed keyframe(s) automatically after a given time period, as in a slideshow, or upon reception of a dedicated user command, such as a voice command or the pressing of a button received by the user interface 111, or a gesture detected in one or more images captured by the camera 116. The display of the keyframes can cease when a localization request—that will be described—leads to successful localization.

The goal of the displayed keyframe is to inform the user of areas in the environment that can lead to successful localization. In other words, the user is guided towards known areas that can lead to a successful localization.

In step S250, the user device 110 receives instructions from the user to send a localization request to the server 120.

In step S260, the user device 110 uses its camera 160 to take an image of the environment and sends the localization request including the image to the server 120. The localization request can also include an indication of the displayed keyframe(s) (and possibly, in particular when the displayed keyframe(s) recently changed, an indication of the keyframe(s) displayed before the change).

In step S270, the server 120 uses the information received in the localization request to attempt to localize the user device 110 and sends the result to the user device.

Simplifying somewhat, conventional approaches for image-based localization can be used by the server 120. Such methods typically include comparing 2D features extracted from a given image with 3D features contained in the 3D representation of the environment and associated with the keyframes. Depending on the scale and the complexity of the reconstructed environment, an exhaustive search for matching the 2D features to 3D features can be computationally expensive and time consuming. Several search strategies to speed up the process can be considered, notably starting with the 3D features associated with displayed or recently displayed keyframes.

In an embodiment, it is the user device 110 that performs the localization based on the captured image and the keyframes. It will be understood that the server 120 in this case can be said to reside on the user device 110.

In different embodiment, the localization computation can be performed automatically as often as allowed by resource constraints, in a regular, systematic manner, on demand only, or punctually (on user demand or on demand invoked automatically by the system under given conditions).

In case the localization fails, the user device can inform the user of this failure, in step S280, and then return to displaying the keyframe(s) in step S240, or inform the user of localization success.

Different scenarios will now be described briefly.

A first scenario corresponds to an embodiment of the method described with reference to FIG. 2, while the second scenario is a variant. The first scenario is primarily intended as a baseline against which the other scenarios can be compared.

In the first scenario, the user device 110 connects to the server 120, obtains contextual help (e.g. keyframes) and renders first contextual help. If no localization instructions are received within a given time, the next contextual help is rendered. If localization instructions are received, a corresponding localization request (possibly including an indicator of the current, and may be also the precedent contextual help) is sent to the server 120 that returns a localization response, which is interpreted by the user device 110 to determine whether or not the localization was successful. In case the localization was not successful, the user device 110 goes back to waiting for localization instructions.

In a second scenario, the user device 110 connects to the server 120, obtains contextual help (e.g. keyframes) and renders first contextual help. The user device 110 then compares features of a captured image with keyframes and determines if the match is sufficiently good. If this is not the case, the comparison continues until a timer fires, triggering rendering of the next contextual help. In case of a sufficiently good match, an indication—e.g. haptic feedback such as a vibration or a sound, or a symbol or colour displayed on the screen—is provided to the user as a signal that a localization request can be sent. Then, upon reception of localization instructions from the user, the corresponding localization request, including an indicator of the matching keyframe, is sent to the server, a localization response is received and used, as in the first scenario, to determine if the localization was successful. It is noted that it is possible for the user device to send the localization request automatically, without needing user instructions to do so.

In an embodiment, keyframes are reframed around detected salient regions so that the reframed parts contain feature points, and only the reframed parts are sent to the user device for display to the user. A reframing solution like the one described in EP 2249307 B1 can be used to this end.

In an embodiment, the server runs automatic textual description on the (possibly reframed) keyframes and the contextual help includes character strings for display on the screen. Such character strings can be a phrase like, "please aim at the TV set"). To achieve this, it is possible to use object detection—see for example Shaoqing Ren, Faster R-CNN, Advances in Neural Information Processing Systems. arXiv:1506.01497, 2015 and Joseph Redmon, Yolov3: An Incremental Improvement, arXiv:1804.02767, 2018—or image captioning—see for example Oriol Vinyals et al., Show and Tell: Lessons learned from the 2015MSCOCO Image Captioning Challenge, PAMI, 2016.

In an embodiment, text-to-speech—see Aaron van den Oord et al., WaveNet: *A Generative Model for Raw Audio*, arXiv:1609.03499, 2016—is used to render a voice telling the user what to capture with the user device. Using the previously mentioned previous strings of characters as input of a text-to-speech converter, the server (or the user device) generates synthesized audio output that is sent (e.g. streamed) to the user device as it is being produced, e.g. using the HTTP chunked encoding. The audio is provided e.g. in the mp3 format.

In an embodiment, the user can use the user interface to select the type of contextual help to be used, e.g. image, text or audio. The user device notifies the server that will now return the contextual help of the requested type.

In an embodiment, particularly interesting for outdoor scenes and extra-large environments, it is assumed that the keyframes are stored with additional metadata related to the GPS location and orientation, complementary to the already described camera position that can be valid only in the coordinate system used by the MR application. It is noted that Exif data contain such fields: GPSLatitude, GPSLongitude, GPSImgDirection. If the user device has a GPS and an internal orientation measurement system (e.g. a compass), a set of images captured close to the current device GPS location and in the same direction as the current device orientation can be proposed to the user. In this embodiment, keyframe selection will typically be done at run time: the user device sends its GPS location and direction, the server computes the closest keyframes in real time (which is very fast to compute, since only three floating numbers are involved for each image). For each keyframe rendered to the user, information about how to orient the device to get a similar viewpoint direction can be provided, for example via arrows displayed at the screen edge: e.g. an arrow on the right side invites the user to turn the device to the right.

In an embodiment, semantic classification is applied on each system keyframe to detect features related to specific objects, focusing on classifying identified objects regarding their probable location and position stability in time. It is possible to construct a global dictionary of identified objects per identified location (e.g. per room), linking features to identified objects and linking objects to rooms.

The dictionary could be maintained and used to enhance the localization procedure. For example, features related to typically immobile objects could be labelled as highly reliable (such as features from walls, the ground . . . ), whereas features belonging to objects identified as easily movable (such as chairs, small items, . . . ) could be labeled as having low reliability for localization.

Keyframe(s) (or area(s) in keyframe(s)) with highly reliable features could then be the preferred choice for use to guide the user during localization process and localization computation, whereas poorly reliable features could be reserved for later to assess the localization quality.

In case of a multi-room environment, a room identifier is first determined (e.g. explicitly by user indication or automatically using input images) such that only relevant keyframes are used. Clustering of keyframes is performed in pre-processing so that keyframes of a same room are grouped together. For automatic room classification it is for example possible to use an approach based on a Convolutional Neural Network (CNN) like the one described in Kamal Othman et al., *An Indoor Room Classification System for Social Robots via Integration of CNN and ECOC*, Applied Sciences. 9. 470. 10. 3390/app9030470. 2019.

In an embodiment, areas subject to frequent change in their appearance, such as for example windows, can be detected using for example CNN so that corresponding keyframes can be omitted from the keyframes provided to the user device.

In an embodiment, information from successful previous localizations can be used, e.g. by increasing the rank of the keyframe(s) rendered when the localization is successful, or, inversely, lowering the ranking of displayed keyframe(s) leading to unsuccessful localization.

In an embodiment, the set of keyframes are filtered with respect to time of captures (e.g. day or night or the season) and/or with respect to the lighting conditions (e.g. light, dark . . . ).

It will thus be appreciated that the present principles can be used to provide a more efficient localization.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A method comprising in at least one hardware processor of a user device:
    sending, upon determination that the user device is not localized, a message to a server, the message indicating that the user device is not localized and including at least one of an indication of the position of the user device or an identifier of a network device to which the user device is directly connected;
    obtaining at least one keyframe, the at least one keyframe being an image of a position in an environment that could enable localization of the user device;
    displaying the at least one keyframe on a screen;
    capturing by a camera an image of the environment;
    sending a localization request including the image to the server; and
    obtaining, from the server in response to the localization request, a localization result based on at least one feature of the at least one displayed keyframe and the image captured by the camera.

2. The method of claim 1, wherein the localization request further includes an indication of the at least one keyframe displayed when the image was captured or just before the at least one displayed keyframe was changed.

3. The method of claim 1, wherein the at least one keyframe obtained by the at least one hardware processor is based at least on the indication of the position of the user device, wherein each keyframe is associated with a position and wherein the at least one displayed keyframe is associated with a position essentially matching a current position of the user device.

4. The method of claim 1, wherein the at least one hardware processor obtains the localization result by performing localization based on at least one feature of at least one keyframe and the image.

5. The method of claim 1, wherein a plurality of keyframes are obtained, wherein a subset of the keyframes is displayed at a given time and wherein the method further comprises displaying a different subset of the keyframes after a given time period, upon reception by a user interface of a dedicated command, or upon detection of a gesture captured by a camera.

6. The method of claim 1, wherein the at least one keyframe is obtained from the server.

7. The method of claim 1, further comprising receiving user instructions to localize the user device.

8. The method of claim 1, further comprising:
    comparing the image and the at least one keyframe displayed on the screen; and
    in case of a positive comparison, performing at least one of: informing a user of the user device of the positive comparison and launching localization in response to the positive comparison.

9. The method of claim 1, wherein the environment comprises a plurality of rooms, wherein the method further comprises obtaining an identifier of a current room and wherein the at least one displayed keyframe is of the current room.

10. A user device comprising:
    a screen;
    a camera; and
    at least one hardware processor configured to:
        send, upon determination that the user device is not localized, a message to a server, the message indicating that the user device is not localized and including at least one of an indication of the position of the user device or an identifier of a network device to which the user device is directly connected;
        obtain at least one keyframe, the at least one keyframe being an image of a position in an environment that could enable localization of the user device;
        display the at least one keyframe on a screen;
        capture by the camera an image of the environment;
        send a localization request including the image to the server; and
        obtain, from the server in response to the localization request, a localization result based on at least one feature of the at least one displayed keyframe and the image captured by the camera.

11. The user device of claim 10, wherein the localization request further includes an indication of the at least one keyframe displayed when the image was captured or just before the at least one displayed keyframe was changed.

12. The user device of claim 10, wherein the at least one hardware processor is configured to obtain the localization result by performing localization based on at least one feature of at least one keyframe and the image.

13. The user device of claim 10, wherein a plurality of keyframes are obtained, and wherein the at least one hardware processor is configured to display a subset of the keyframes at a given time, and to display a different subset of the keyframes after a given time period, upon reception by a user interface of a dedicated command, or upon detection of a gesture captured by a camera.

14. The user device of claim 10, wherein the at least one hardware processor is configured to:
compare the image and the at least one keyframe displayed on the screen; and
in case of a positive comparison, at least one of: inform a user of the user device of the positive comparison and launch localization in response to the positive comparison.

15. The user device of claim 10, wherein the at least one keyframe obtained by the at least one hardware processor is based at least on the indication of the position of the user device, wherein each keyframe is associated with a position and wherein the at least one displayed keyframe is associated with a position essentially matching a current position of the user device.

16. The user device of claim 10, wherein the at least one keyframe is obtained from the server.

17. The user device of claim 10, wherein the at least one hardware processor is further configured to receive user instructions to localize the user device.

18. A server device comprising:
a communication interface configured to communicate with a user device; and
at least one hardware processor configured to:
receive from the user device a message indicating that the user device is not localized;
select and send at least one keyframe to the user device, the at least one keyframe being an image of a position in an environment that could enable localization of the user device;
receive an image from the user device;
obtain a localization result based on at least one feature of at least one keyframe and the image received from the user device; and
send the localization result to the user device.

19. A non-transitory computer-readable storage medium storing instructions that, when executed, cause at least one hardware processor to:
send, upon determination that a user device is not localized, a message to a server, the message indicating that the user device is not localized and including at least one of an indication of the position of the user device or an identifier of a network device to which the user device is directly connected;
obtain at least one keyframe, the at least one keyframe being an image of a position in an environment that could enable localization of the user device;
display the at least keyframe on a screen;
capture by a camera an image of the environment;
send a localization request including the image to the server; and
obtain, from the server in response to the localization request, a localization result based on at least one feature of at least one displayed keyframe and the image captured by the camera.

20. The non-transitory computer-readable storage medium of claim 19, wherein the at least one keyframe obtained by the at least one hardware processor is based at least on the indication of the position of the user device, wherein each keyframe is associated with a position and wherein the at least one displayed keyframe is associated with a position essentially matching a current position of the user device.

\* \* \* \* \*